(12) United States Patent
Al-Harthi et al.

(10) Patent No.: US 9,145,492 B1
(45) Date of Patent: Sep. 29, 2015

(54) METHOD TO PRODUCE ULTRA-HIGH MOLECULAR WEIGHT POLYETHYLENE

(71) Applicant: KING FAHD UNIVERSITY OF PETROLEUM AND MINERALS, Dhahran (SA)

(72) Inventors: Mamdouh Ahmad Al-Harthi, Dhahran (SA); Omer Yahya Bakather, Dhahran (SA); Sadhan Kumar De, Dhahran (SA); Reyad Awwad Khalaf Shawabkeh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/242,497

(22) Filed: Apr. 1, 2014

(51) Int. Cl.
*C08K 9/02* (2006.01)
*C08F 110/02* (2006.01)
*C08K 3/22* (2006.01)

(52) U.S. Cl.
CPC .............. *C08K 9/02* (2013.01); *C08F 110/02* (2013.01); *C08F 2500/01* (2013.01); *C08K 2003/2241* (2013.01); *C08K 2003/2258* (2013.01)

(58) Field of Classification Search
CPC ............... C08F 2500/01; C08F 2003/2241; C08F 2003/2258; C08F 2003/0887
USPC ........................................................ 524/406
See application file for complete search history.

(56) References Cited

U.S. PATENT DOCUMENTS

| | | | | |
|---|---|---|---|---|
| 3,536,796 A * | 10/1970 | Rock | ................................ | 264/49 |
| 5,593,719 A * | 1/1997 | Dearnaley et al. | ............ | 427/2.26 |
| 8,188,199 B1 * | 5/2012 | Al-Harthi et al. | .............. | 526/113 |
| 8,242,219 B1 * | 8/2012 | Al-Harthi et al. | ................ | 526/89 |
| 8,541,520 B1 * | 9/2013 | Al-Harthi et al. | .............. | 526/107 |
| 8,604,115 B1 * | 12/2013 | Al-Harthi et al. | .............. | 524/400 |
| 8,722,821 B1 * | 5/2014 | Al-Harthi et al. | .............. | 526/135 |
| 2006/0234857 A1 * | 10/2006 | Jayaratne et al. | .............. | 502/103 |
| 2010/0015379 A1 * | 1/2010 | Matsushita | .................. | 428/41.5 |
| 2011/0091897 A1 * | 4/2011 | Jackson et al. | .................... | 435/6 |
| 2011/0292502 A1 * | 12/2011 | Meyer et al. | .................. | 359/359 |
| 2015/0024211 A1 * | 1/2015 | Miratsu et al. | ................ | 428/412 |

OTHER PUBLICATIONS

Kemp et al. Polymer Degradation and Stability 91 (2006) pp. 3020-3025.*
Wu, Ji-Qian et al., "Synthesis, Structural Characterization, and Ethylene Polymerization Behavior of the Vanadium(III) Complexes Bearing Salicylaldiminato Ligands". Organometallics, 2008, 27(15): p. 3340-3848.
Wu, Ji-Qian et al., "Ethylene Polymerization and Ethylene/Hexene Copolymerization with Vanadium (III) Catalysts Bearing Heteroatom-Containing Sallcylaldiminato Ligands", Journal of Polymer Science: Part A: Polymer Chemistry (2009), vol. 47, pp. 3573-3582.

* cited by examiner

*Primary Examiner* — Michael Pepitone
*Assistant Examiner* — Michael A Salvitti
(74) *Attorney, Agent, or Firm* — Richard C. Litman

(57) ABSTRACT

The method to produce ultra-high-molecular-weight polyethylene (UHMWPE) incorporates tungsten-doped titania ($TiO_2$/W) nanofiller during the ethylene polymerization process. The UHMWPE possesses improved mechanical and thermal properties. The process for producing the UHMWPE includes contacting ethylene under polymerization conditions with a polymerization catalyst (a vanadium (III) complex bearing bidentate salicylaldiminato ligands) in the presence of $TiO_2$/W nanofiller and a co-catalyst in a reactor. The reactor is charged with solvent (e.g., toluene) and heated to a temperature suitable for polymerization, e.g., about 30° C. Following heating, the ethylene monomer is fed into the reactor and allowed to saturate for at least 10 minutes, and a methyl aluminum dichloride co-catalyst (MADC) is added to initiate polymerization of ethylene. Polymerization is quenched by adding methanol containing HCl incorporated with titania-tungsten nanofillers, which is then washed and dried to yield UHMWPE.

12 Claims, 1 Drawing Sheet

METHOD TO PRODUCE ULTRA-HIGH MOLECULAR WEIGHT POLYETHYLENE

BACKGROUND OF THE INVENTION

1. Field of the Invention

The present invention relates to polymers, and particularly to a method to produce ultra-high molecular weight polyethylene (UHMWPE) using a tungsten-doped titania ($TiO_2$/W) nanofiller.

2. Description of the Related Art

Ultra-high molecular weight polyethylene (UHMWPE) is an exceptional polymer with unique mechanical and physical properties such as chemical resistance, impact resistance, abrasion resistance, lubricity and thermal stability. These properties are directly related to the molecular and super molecular structure of the polyethylene polymer. Ultra-high molecular weight polyethylene is obtained by polymerizing ethylene at low pressure using Zeigler-Natta catalyst supported by fixing $TiCl_4$ or $VOCl_3$ onto amorphous $SiO_2$. Recently methyl aluminum dichloride (MADC) was found to be a potential cocatalyst in the polymerization/oligomerization process.

It is common in the plastics industry to blend various additives with a matrix polymer for the purpose of improving one or more polymer physical properties. Such compositions that contain nanofillers dispersed in a polymer matrix are referred to as nanocomposites. Polyolefin nanocomposites are of great interest in industry because they possess exceptional mechanical properties, flammability, gas barrier properties and thermal stability depending on their shape, loading, particles size, dispersion of the fillers and bonding. Polymer composites have been made by (a) solution mixing, (b) melt compounding and (3) in situ polymerization. Among these methods, in-situ polymerization is considered to be more promising since it leads to a homogeneous dispersion of filler in the polymer matrix.

In recent years, highly effective nanoparticle fillers have been developed and used as additives in polymer matrices. For example, various inorganic nanoparticles have been used as nanofillers such as titanium dioxide ($TiO_2$), silicon dioxide ($SiO_2$), aluminum trioxide ($Al_2O_3$) and zinc dioxide ($ZrO_2$) to improve polymer properties. Polymer-based $TiO_2$ composites have been extensively studied in the literature to improve mechanical and thermal properties of the polymer. Although $TiO_2$-filled polymers are known, the properties of such composite materials are fixed.

It would be desirable to provide a method for producing ultra-high molecular weight polyethylene (UHMWPE) with tungsten doped titania nanofiller material ($TiO_2$/W) that permits control over and variation of the overall polymeric properties, such as molecular weight and the associated thermal properties.

Thus, a method to produce ultra-high molecular weight polyethylene solving the aforementioned problems is desired.

SUMMARY OF THE INVENTION

The invention provides a method for polymerizing ethylene monomer to produce ultra-high-molecular-weight polyethylene (UHMWPE) by incorporating tungsten (W) doped titania ($TiO_2$/W) nanofiller during the ethylene polymerization process, which produces UHMWPE with improved thermal properties. Specifically, the process for producing the (UHMWPE) comprises contacting ethylene under polymerization conditions with a catalyst composition comprising a polymerization catalyst (vanadium (III) complex bearing bidentate salicylaldiminato ligands in the presence of $TiO_2$/W nanofiller and a co-catalyst in a reactor. The reactor is charged with a solvent (e.g., toluene) and heated to a temperature suitable for polymerization, e.g., about 30° C. Following heating, the ethylene monomer is fed into the reactor and allowed to saturate for at least 10 minutes and a methyl aluminum dichloride co-catalyst (MADC) is added to initiate polymerization of ethylene. Polymerization is quenched by adding methanol containing HCl, which is then washed and dried to yield UHMWPE incorporated with titania-tungsten nanofillers.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A method to produce ultra-high molecular weight polyethylene with improved mechanical and thermal properties using metallocene catalyst with tungsten-doped titanium dioxide as nanofiller is disclosed.

Figure 1:
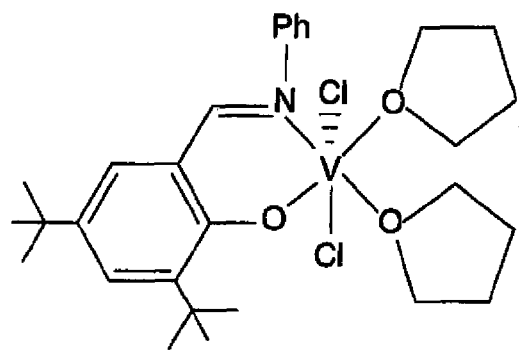
FIG. 1 shows the structural formula of the catalyst composed of vanadium (III) complex with bidentate salicylaldiminato ligands used in the method of making high-density polyethylene with titania-iron nanofillers.

The method of making high-density polyethylene (HDPE) with titania-tungsten nanofillers permits control over and variation of the overall polymeric properties, such as molecular weight and the associated thermal properties. As will be shown below, through the addition of $TiO_2$/W nanofiller, the molecular weight, the crystallinity and the melting temperature of high-density polyethylene are all increased, while the polydispersity index (PDI) is decreased. In order to make the high-density polyethylene with titania-tungsten nanofillers, a polymerization catalyst is first prepared. The catalyst is a vanadium (III) complex bearing salicylaldiminato ligands of the general class [RN=CH(2,4-($Bu_2C_6H_{12}$O))]$VCl_2(THF)_2$, and more particularly, having the formula shown in FIG. 1.

EXAMPLE 1

Synthesis of Vanadium Catalyst

The vanadium catalyst was synthesized by conventional methods, such as that taught in Wu, J.-Q., et al., "Synthesis, Structural Characterization, and Ethylene Polymerization Behavior of the Vanadium(III) Complexes Bearing Salicylaldiminato Ligands", Organometallics, 2008, 27(15): p. 3840-3848 (in particular, the catalyst is designated catalyst 2a in the Wu article, shown in Scheme 1 at p. 3841), which is hereby incorporated by reference in its entirety. In this procedure, $VCl_3(THF)_3$ (0.75 g) was dissolved in dried tetrahydrofuran (20 mL) and added slowly to a solution of salicylaldiminato ligand, [RN=CH(2,4-$^tBu_2C_6H_{12}$O))]$VCl_2(THF)_2$, (0.40 g) in tetrahydrofuran (20 mL) to form a red mixture. This mixture was stirred for 10 min, after which $Et_3N$ (0.3 mL, 216 mg) was added and stirred for 4 hours at room temperature.

Finally, the solution was concentrated to about 10 mL, and then the mixture was filtered to remove $NH_4Cl$. Red-black crystals formed by diffusion of n-hexane (20 mL) into the solution, thus producing the vanadium (III) complex bearing salicylaldiminato ligands shown in FIG. 1 that is used as the polymerization catalyst.

EXAMPLE 2

Synthesis of Undoped and Doped Titania Nanofiller

As a control, undoped titania nanofillers were synthesized, in addition to nanofillers formed from titania doped with tungsten. Basically, undoped titania nanofillers were synthesized by a modified sol-gel process under constant sonication. Titanium (IV) alkoxide precursor (1 ml) in 5 ml ethanol was hydrolyzed in the presence of 1 ml of water at room temperature to form a white solution of hydrolyzed titania particles. For titania nanofillers doped with tungsten, 1.2 g of tungsten (VI) oxide were dissolved in 25 ml of ethanol and then added to the hydrolyzed titania solution under constant sonication. The reaction mixture was sonicated for 30 minutes. After this duration, the precipitate was washed with ethanol many times to remove excess $NO_3^-$. The precipitate was dried overnight at 100° C. and then heated for 5 hours to convert the amorphous titania into the crystalline anatase form. Finally, the product was ground into a fine powder. The samples were denoted as $TiO_2$/W for titania doped with tungsten. The average particle size of the nanofiller that was produced was 10 nm.

EXAMPLE 3

Polymerizing Ethylene with $TiO_2$/W Nanofiller

Ethylene polymerization was conducted in a 250 mL round-bottom flask equipped with a magnetic stirrer. A portion of the catalyst (prepared in advance, as described above) and a required amount of the $TiO_2$/W nanofiller were added to the flask, and the reactor was charged with toluene (80 mL). Then, the flask was immersed in oil bath and when reactor temperature was equilibrated with bath oil temperature (30° C.), nitrogen gas was removed by vacuum pump. Then ethylene was fed into the reactor. After 10 minutes of saturation of ethylene in toluene, polymerization was initiated with the introduction of 1 mL of the cocatalyst (MADC) into the reactor. Polymerization reaction was quenched by adding 250 mL of methanol containing HCl (5 vol. %). Finally, the polymer was washed with an excess amount of methanol and dried inside an oven at 50° C. for 24 hours.

GPC Analysis: Molecular weight of polyethylene composites was determined by Triple Detection High Temperature Gel Permeation Chromatography (GPC) using 1,2,4-trichlorobenzene as a solvent. 25 mg of the material was placed into a 40 mL glass vial and accurately weighed and 10 mL of the solvent was added using a clean 10 mL glass pipette. The vial was capped with a Teflon coated cap and the samples were placed into the Vortex Auto Sampler and left to dissolve for 3 hrs at 160° C. while stirring gently.

DSC Analysis: Crystallinity of ethylene, ethylene nanocomposites (Xc %) and melting temperature ($T_m$) were measured by differential scanning calorimetry (DSC) from TA instruments Q1000. Heating and cooling for both first and second cycles were done in nitrogen atmosphere at the rate of 10° C. $min^{-1}$ from a temperature of 30° C. to 160° C.

Figure 2:
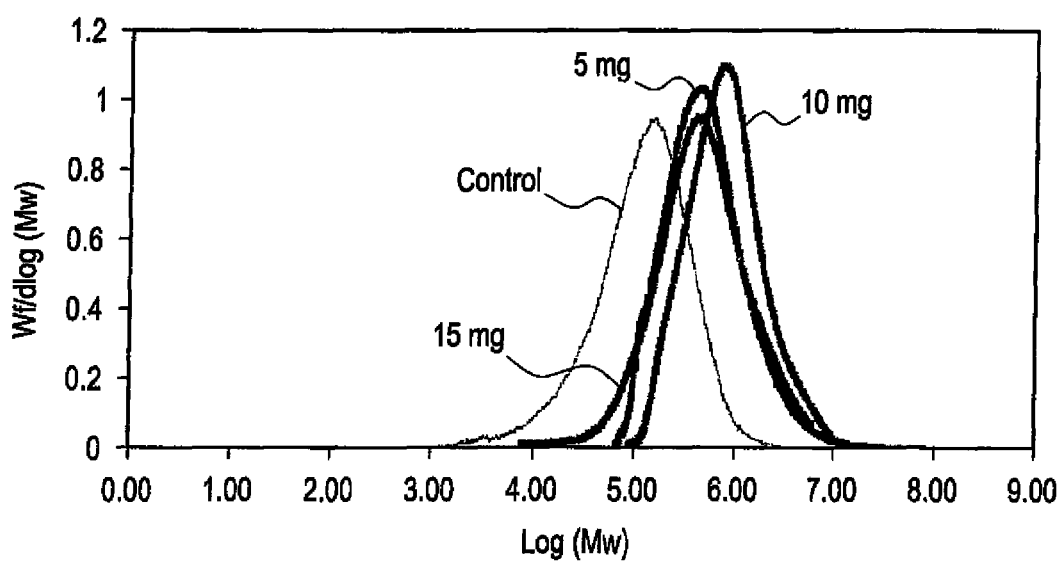
FIG. 2 is a graph illustrating the molecular weight distribution of the high-density polyethylene nanocomposites using gel permeation chromatography.

As shown below in Table 1, the molecular weight (Mw) of the polyethylene was found to increase by adding $TiO_2$/W filler with vanadium complex during polymerization. The optimum value for the filler was 10 mg (Entry 2, Table 1) which molecular weight (Mw) was $1.2 \times 10^6$ (g $mol^{-1}$). An increase in the filler concentration 15 mg resulted in a decrease in the molecular weight (Mw) when compared to the 10 mg of filler concentration but still showed a significant increase compared to the control. Polydispersity index (PDI) was decreased by adding $TiO_2$/W nanofiller and decreased with increasing the amount of the $TiO_2$/W nanofiller as shown in Table 1. This decrease in PDI improved the thermal properties of polyethylene nano-composites. FIG. 2 illustrates the molecular weight distribution of the polyethylene nanocomposites using gel permeation chromatography.

The thermal characteristics of the polyethylene nanocomposites were determined by differential scanning calorimetry (DSC). The melting temperatures of polyethylene and polyethylene nanocomposites samples were determined by DSC from the second heating cycle. The results of the in situ polymerization using vanadium complex catalyst of FIG. 1 and MADC co-catalyst system at 1.3 bar and the resulting polymer nanocomposite characteristics of the UHMWPE are summarized in Table 1.

TABLE 1

UHMWPE Properties as a Function of Nanofiller Content

| Entry No. | $TiO_2$/W (mg) | Mw (Daltons) $\times 10^{-4}$ | PDI | Tm (° C.) | % of Crystallinity ($X_c$) |
|---|---|---|---|---|---|
| 1 | 0 | 19.5 | 3.7 | 135 | 50 |
| 2 | 5 | 86.2 | 2.5 | 136 | 52 |
| 3 | 10 | 120 | 2.1 | 137 | 51 |
| 4 | 15 | 78.6 | 2.6 | 135.5 | 49 |

The polyethylene nanocomposites showed that the melting temperature ($T_m$) was slightly higher (Entry 2 and 3, Table 1) than that of the control (Entry 1, Table 1) due to the presence of the nanofiller and the increase in the molecular weight of polyethylene nanocomposites. The percentage of crystallinity in polyethylene nanocomposites samples was determined and showed that the percentage of crystallinity in polyethylene nanocomposites increased slightly to 52% using 5 mg of $TiO_2$/W (Entry 2, Table 1) as compared to the control (Xc=50%) (Entry 1, Table 1). When the amount of the filler increased, the crystallinity increased to 49%, using 15 mg of $TiO_2$/W nanofiller with Tm=135.5° C. (Entry 4, Table 1).

The above-described process unexpectedly produces polyethylene nanocomposites (UHMWPE) with improved thermal properties and impact resistance.

It is to be understood that the present invention is not limited to the embodiments described above, but encompasses any and all embodiments within the scope of the following claims.

We claim:

1. A method of producing ultra-high molecular weight polyethylene, comprising the step of polymerizing ethylene monomer in situ in the presence of a polymerization catalyst, a tungsten-doped nanofiller, and a co-catalyst, at a temperature of about 30° C. in an organic solvent.

2. The method of producing ultra-high molecular weight polyethylene as recited in claim 1, wherein the tungsten-doped nanofiller comprises nanoparticles of tungsten-doped titanium dioxide, the nanoparticles having an average particle size of 10 nm.

3. The method of producing ultra-high molecular weight polyethylene as recited in claim 1, wherein the co-catalyst is methyl aluminum dichloride (MADC).

4. The method of producing ultra-high molecular weight polyethylene as recited in claim 1, wherein the polymerization catalyst is vanadium (III) complex catalyst with salicylaldiminato ligands having the formula:

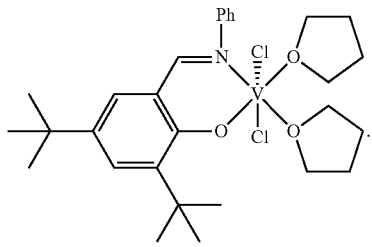

5. A method of producing ultra-high molecular weight polyethylene, comprising the steps of:
   mixing a polymerization catalyst and a tungsten-doped nanofiller onto a reactor;
   heating the reactor to attain a polymerization reaction temperature;
   feeding ethylene monomer into the reactor;
   adding methyl aluminum dichloride as a co-catalyst to the reactor to initiate in situ polymerization.

6. The method of producing ultra-high molecular weight polyethylene according to claim 5, further comprising the step of quenching the polymerization reaction by adding methanol, the methanol including 5% hydrochloric acid.

7. The method to produce ultra-high molecular weight polyethylene according to claim 5, further comprising the step of washing the polymer with an excess amount of methanol and drying for at least 24 hours at 50° C.

8. The method of producing ultra-high molecular weight polyethylene as recited in claim 5, wherein the polymerization catalyst is vanadium (III) complex catalyst with salicylaldiminato ligands having the formula:

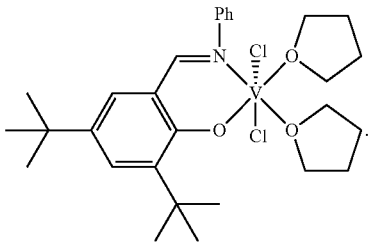

9. The method of producing ultra-high molecular weight polyethylene as recited in claim 5, further comprising the step of removing nitrogen from the reactor prior to the step of feeding ethylene monomer into the reactor.

10. The method of producing ultra-high molecular weight polyethylene as recited in claim 5, further comprising the step of removing nitrogen from the reactor prior to the step of feeding ethylene monomer into the reactor.

11. The method of producing ultra-high molecular weight polyethylene according to claim 5, further comprising the step of saturating the ethylene monomer in toluene prior to the step of feeding ethylene monomer into the reactor.

12. The method of producing ultra-high molecular weight polyethylene as recited in claim 5, wherein the tungsten-doped nanofiller comprises nanoparticles of tungsten-doped titanium dioxide, the nanoparticles each having a particle size of 10 nm.

\* \* \* \* \*